US010126786B2

(12) United States Patent
Szeremeta et al.

(10) Patent No.: US 10,126,786 B2
(45) Date of Patent: Nov. 13, 2018

(54) EJECTION MECHANISM ASSEMBLY FOR STORAGE DRIVE AND STORAGE DRIVE HAVING THE EJECTION MECHANISM ASSEMBLY

(71) Applicant: Western Digital Technologies, Inc., Irvine, CA (US)

(72) Inventors: Wojciech Szeremeta, Mission Viejo, CA (US); Bruce A. Cariker, Diamond Bar, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 614 days.

(21) Appl. No.: 14/813,634

(22) Filed: Jul. 30, 2015

(65) Prior Publication Data
US 2017/0034942 A1    Feb. 2, 2017

(51) Int. Cl.
*G11B 33/12*    (2006.01)
*G06F 1/18*     (2006.01)

(52) U.S. Cl.
CPC .............. *G06F 1/18* (2013.01); *G11B 33/124* (2013.01); *G11B 33/128* (2013.01)

(58) Field of Classification Search
None
See application file for complete search history.

(56) References Cited

U.S. PATENT DOCUMENTS

| 5,222,897 | A | * | 6/1993 | Collins ................ H05K 7/1409 |
| | | | | 361/801 |
| 7,701,705 | B1 | | 4/2010 | Szeremeta |
| 8,045,326 | B1 | | 10/2011 | Reznikov |
| 8,064,194 | B2 | | 11/2011 | Szeremeta |
| 8,113,873 | B1 | | 2/2012 | Sarraf |
| 8,133,426 | B1 | | 3/2012 | Yurchenco et al. |
| 8,358,395 | B1 | | 1/2013 | Szeremeta |
| 8,417,979 | B2 | | 4/2013 | Maroney |
| 8,462,460 | B1 | | 6/2013 | Szeremeta et al. |
| 8,498,088 | B1 | | 7/2013 | Klein |
| 8,508,928 | B2 | * | 8/2013 | Killen .................. G11B 33/124 |
| | | | | 361/679.33 |
| 8,547,658 | B1 | | 10/2013 | Szeremeta |

(Continued)

FOREIGN PATENT DOCUMENTS

| WO | 2008128094 | | 10/2008 | |
| WO | WO-2008128094 | A1 * | 10/2008 | ............. G06F 1/187 |

OTHER PUBLICATIONS

International Search Report and Written Opinion for PCT App No. PCT/US2016/044093 dated Oct. 27, 2016, 16 pgs.

*Primary Examiner* — William J Klimowicz

(57) ABSTRACT

A drive ejection mechanism, a storage drive enclosure and a server device having the drive ejection mechanism assembly are provided. The ejection mechanism assembly includes a lower guide member, an ejection member, a drive retaining member, and a biasing member. The lower guide member have a first end and a second end and may include a floor and at least one sidewall defining a lower drive insertion path. The ejection member may be slidingly coupled to the lower guide member. The drive retaining member may be hingedly connected to the first end of the lower guide member. The biasing member may be configured to bias the ejection member toward the first end of the lower guide member.

20 Claims, 12 Drawing Sheets

(56) References Cited

U.S. PATENT DOCUMENTS

| | | | |
|---|---|---|---|
| 8,705,201 B2 | 4/2014 | Casey et al. | |
| 8,705,230 B2* | 4/2014 | Wen | G11B 33/128 |
| | | | 361/679.38 |
| 8,902,579 B1* | 12/2014 | Lalouette | G06F 1/187 |
| | | | 361/679.33 |
| 8,991,950 B2* | 3/2015 | Privitera | G06F 1/183 |
| | | | 312/309 |
| 9,042,094 B2* | 5/2015 | Williams | G06F 1/16 |
| | | | 361/679.37 |
| 9,052,878 B2* | 6/2015 | Lo | G06F 1/187 |
| 9,063,705 B2* | 6/2015 | Howell | H05K 7/1405 |
| 9,203,188 B1* | 12/2015 | Siechen | H01R 13/62994 |
| 9,268,357 B2* | 2/2016 | Kyle | G06F 1/16 |
| 9,337,562 B1* | 5/2016 | Kuo | H01R 13/4538 |
| 9,389,651 B2* | 7/2016 | Brockett | G06F 1/187 |
| 9,798,362 B2* | 10/2017 | Adrian | G06F 1/184 |
| 2008/0205026 A1* | 8/2008 | Gallarelli | G11B 33/12 |
| | | | 361/818 |
| 2009/0091884 A1 | 4/2009 | Walker et al. | |
| 2011/0096490 A1 | 4/2011 | Sanchez et al. | |
| 2013/0070415 A1 | 3/2013 | Terry | |
| 2013/0229766 A1* | 9/2013 | Williams | G06F 1/16 |
| | | | 361/679.33 |
| 2014/0016262 A1 | 1/2014 | Lo | |
| 2015/0015131 A1* | 1/2015 | Privitera | G06F 1/183 |
| | | | 312/309 |

\* cited by examiner

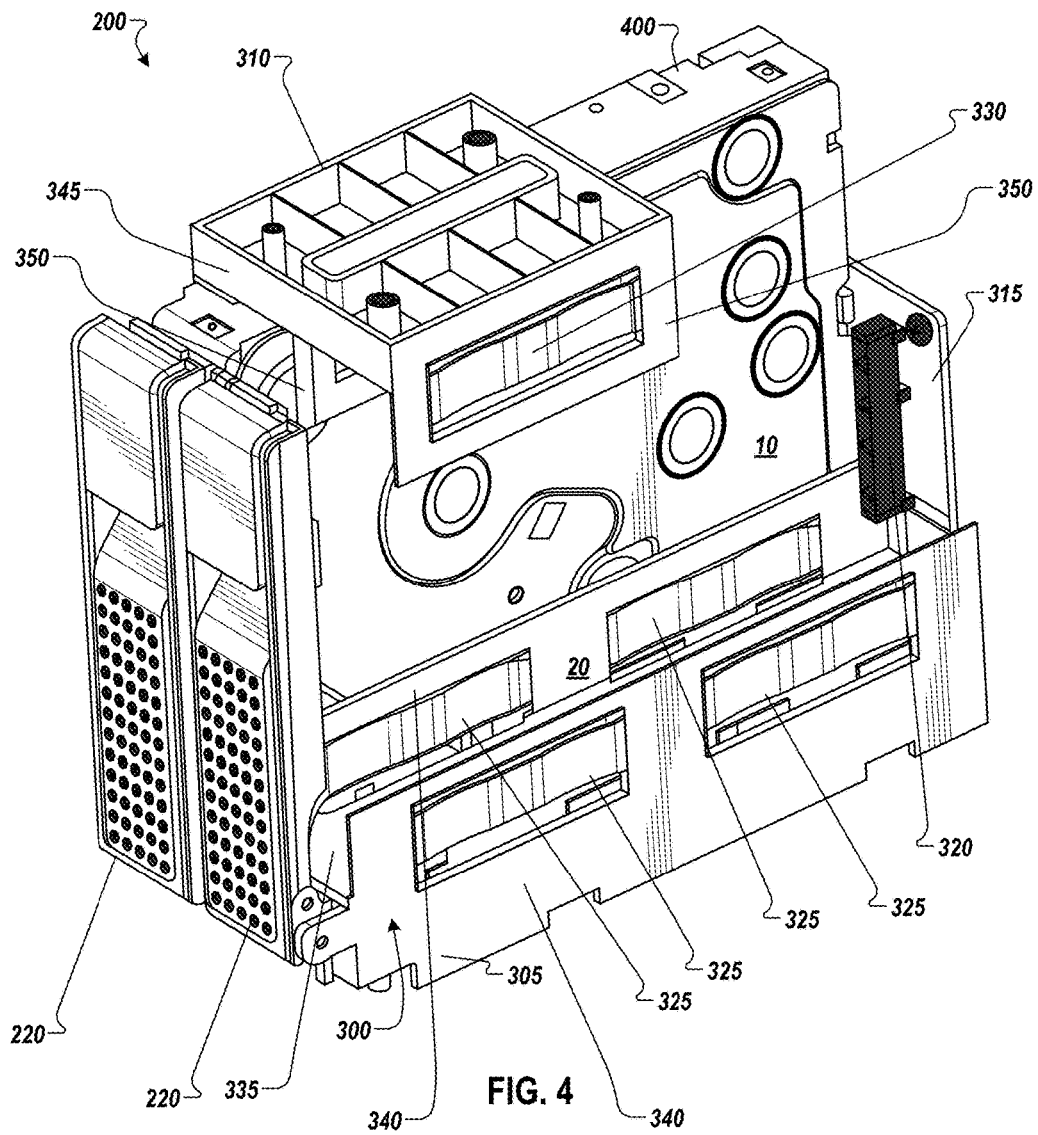

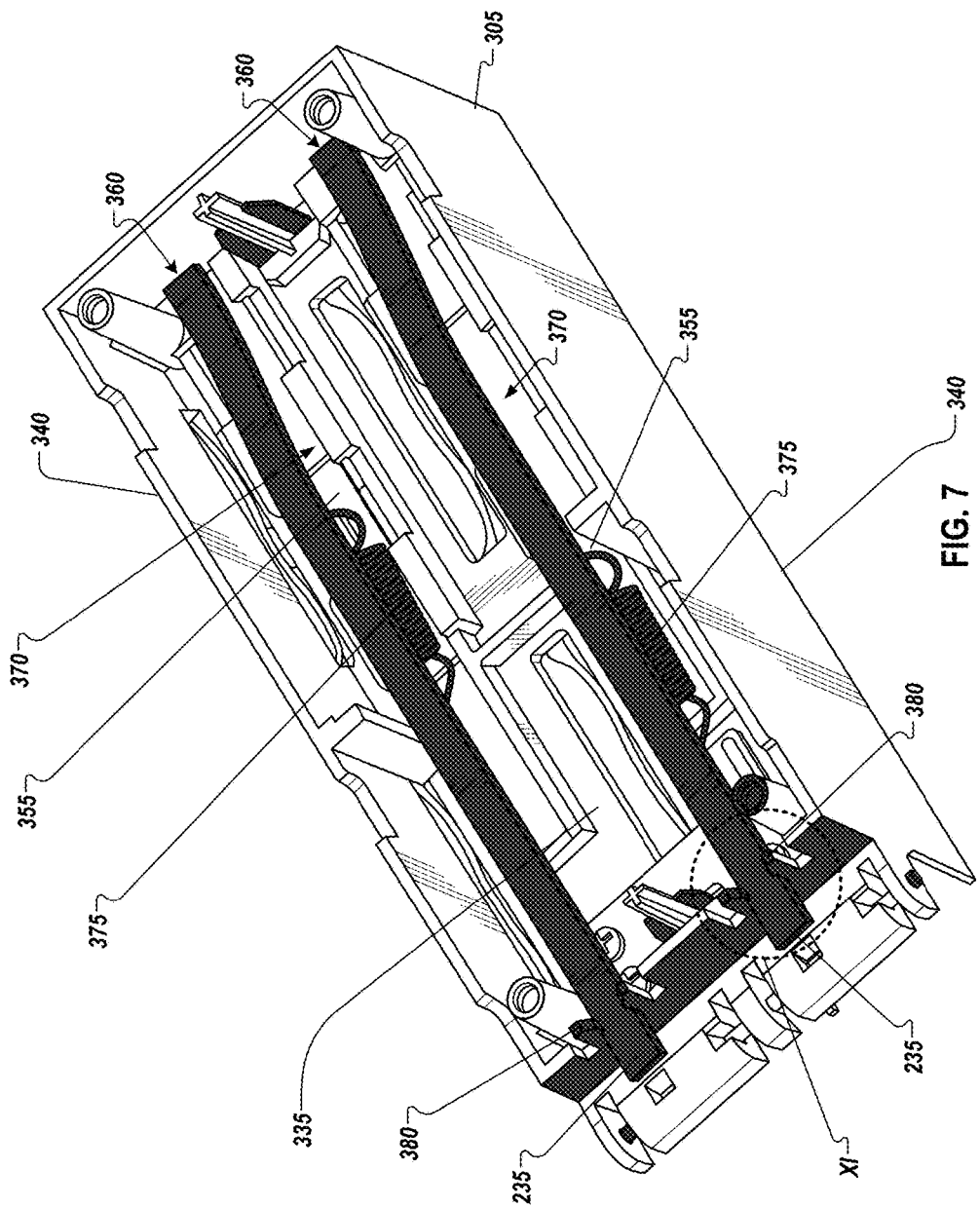

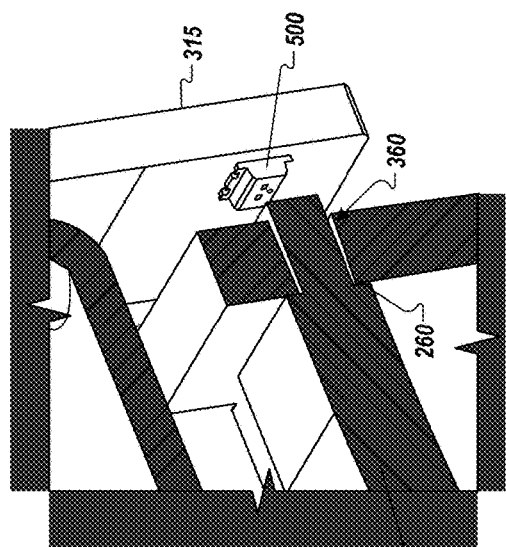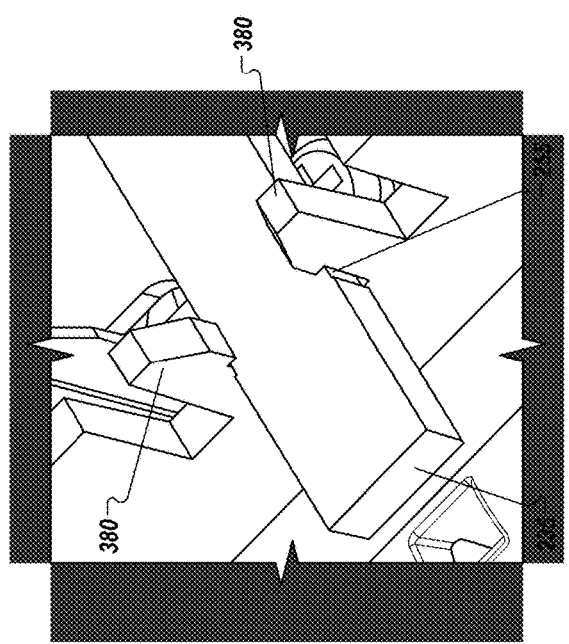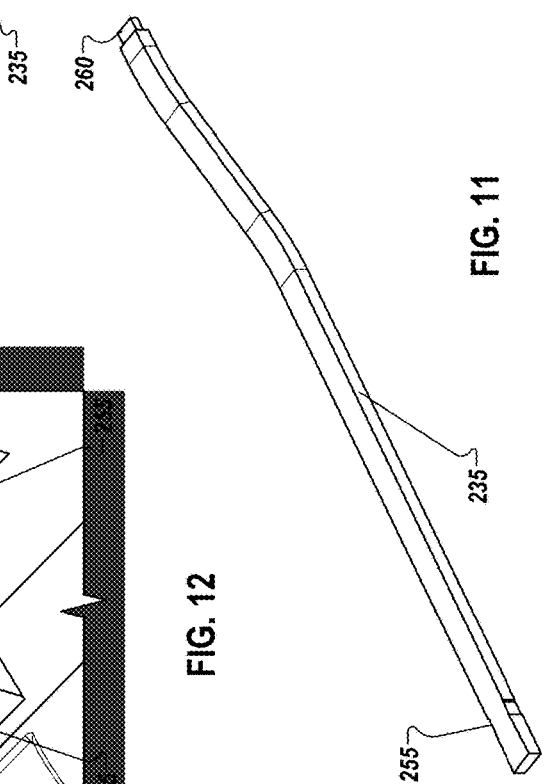
FIG. 11
FIG. 12
FIG. 13

EJECTION MECHANISM ASSEMBLY FOR STORAGE DRIVE AND STORAGE DRIVE HAVING THE EJECTION MECHANISM ASSEMBLY

BACKGROUND

Some existing server class storage drive enclosures use either a tray or trayless disk drive retention design. Both tray and trayless designs serve to retain the drive within the enclosure, and often facilitate disk drive hot swap functionality. However, existing designs often required additional tools to install, remove, or swap drives within the chassis.

BRIEF DESCRIPTION OF THE DRAWINGS

A general architecture that implements features of the disclosure will now be described with reference to the drawings. The drawings and the associated descriptions are provided to illustrate embodiments of the disclosure and not to limit the scope of the disclosure. Through the drawings, reference numbers are reused to indicate correspondence between referenced elements.

FIG. 4 is a perspective view of the drive enclosure of FIG. 2 with the top panel, side panels, and front panel removed and with a storage drive installed.

FIG. 7 illustrates a bottom perspective view of the lower guide member of FIGS. 6A and 6B with the light pipe installed.

FIG. 11 is a perspective view of the light bar removed from the lower guide member.

FIG. 12 is an enlarged portion of FIG. 7 illustrating a portion of the lower guide member.

FIG. 13 is an enlarged view of light source of the back plane illustrated in FIG. 10.

DETAILED DESCRIPTION

The subject matter described herein is taught by way of example embodiments. Various details may be omitted for the sake of clarity and to avoid obscuring the subject matter described. The examples shown below are directed to structures for implementing dual stage actuation head-gimbal assembly support during shipping and processing.

Figure 1:
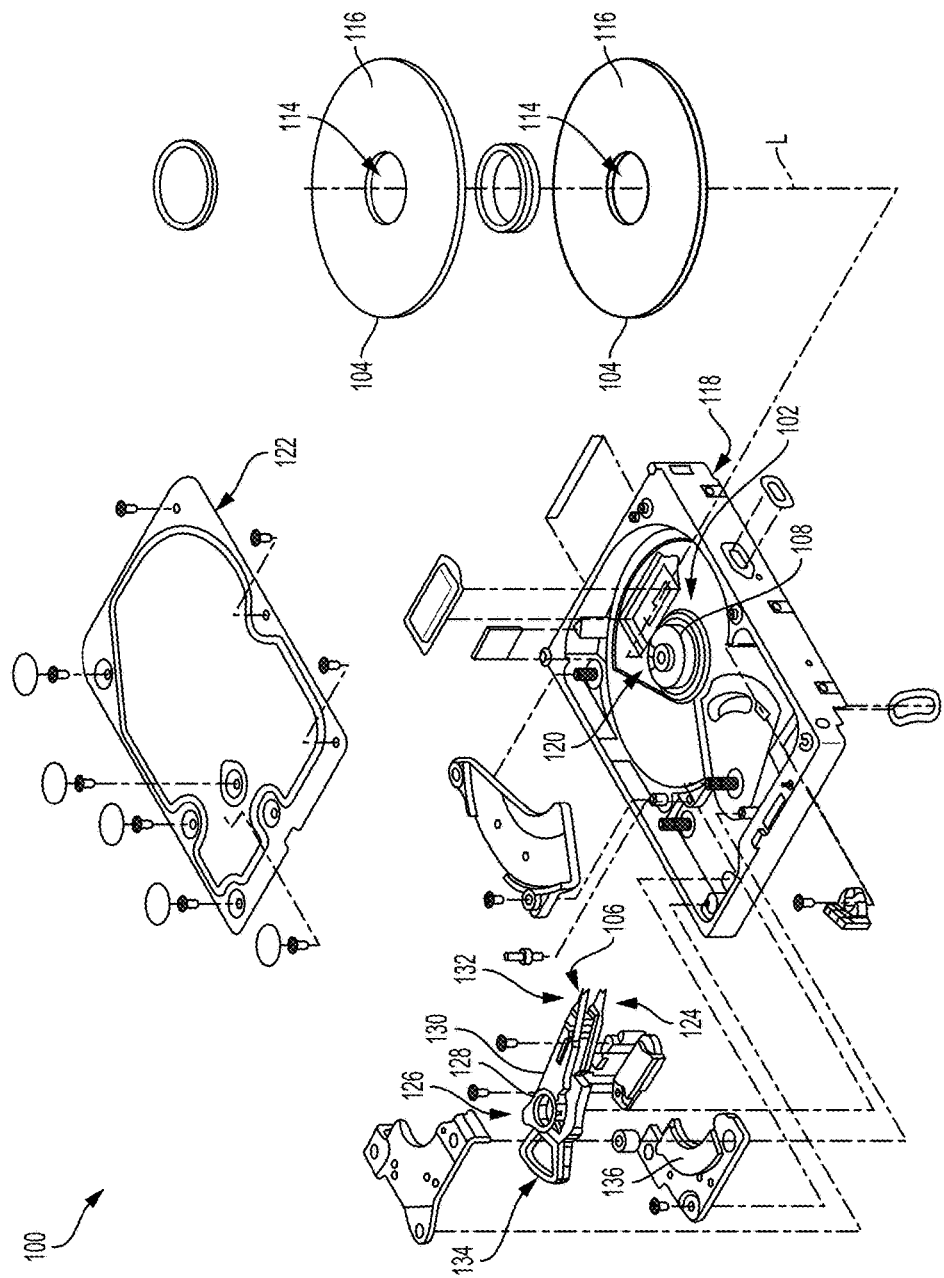
FIG. 1 is an exploded, perspective view generally illustrating a disk drive.

Referring to FIG. 1, a storage device 100 is illustrated, according to one embodiment. The storage device 100 comprises a hub 102, a media 104 physically contacting and supported by at least one mounting surface (not labeled) of the hub 102, and a head 106 operable to write to and read from the media 104. In one embodiment, the hub 102 comprises a substantially cylindrical portion 108 which defines a longitudinal axis L and a mounting surface substantially normal to the longitudinal axis L, the mounting surface extending radially outward.

As illustrated in FIG. 1, a storage device 100 comprises a magnetic disk drive, and the structures and methods described herein will be described in terms of such a disk drive. However, these structures and methods may also be applied to and/or implemented in other storage devices, including, e.g., solid-state hybrid drives (SSHD), optical and magneto-optical disk drives. Solid-state hybrid drives may additionally include non-volatile memory (e.g., flash).

The media 104 may comprise any of a variety of magnetic or optical disk media having a substantially concentric opening 114 defined there through. Of course, in other embodiments, the storage device 100 may include more or fewer disks. For example, the storage device 100 may include one disk or it may include two or more disks. The media 104 each include a disk surface 116, as well as an opposing disk surface not visible in FIG. 1 above. In one embodiment, the disk surfaces 116 comprise a plurality of generally concentric tracks for storing data.

As illustrated, the hub 102 may be coupled to and support the media 104. The hub 102 may also be rotatably attached to a motor base 118 of the storage device 100, and may form one component of a motor 120 (e.g., a spindle motor). The motor 120 and the hub 102 may be configured to rotate the media 104 about the longitudinal axis L.

Further, a disk clamp may be coupled to the hub 102 to provide a downward clamping force to the media 104. Specifically, the disk clamp may be positioned above the media 104 and attached to an upper surface of the hub 102. The interaction of the disk clamp and the hub 102 provides downward clamping force.

The storage device 100 may further include a cover 122, which, together with the motor base 118, may house the media 104 and the motor 120. The storage device 100 may also include a head stack assembly ("HSA") 124 rotatably attached to the motor base 118. The HSA 124 may include an actuator 126 comprising an actuator body 128 and one or more actuator arms 130 extending from the actuator body 128. The actuator body 128 may further be configured to rotate about an actuator pivot axis.

One or two head gimbal assemblies ("HGA") 132 may be attached to a distal end of each actuator arm 130. Each HGA 132 includes a head 106 operable to write to and read from a corresponding media 104. The HSA 124 may further include a coil 134 through which a changing electrical current is passed during operation. The coil 134 interacts with one or more magnets 136 that are attached to the motor base 118 to form a voice coil motor ("VCM") for controllably rotating the HSA 124.

The head 106 may comprise any of a variety of heads for writing to and reading from a media 104. In magnetic recording applications, the head 106 may include an air bearing slider and a magnetic transducer that includes a writer and a read element. The magnetic transducer's writer may be of a longitudinal or perpendicular design, and the read element of the magnetic transducer may be inductive or magneto resistive. In optical and magneto-optical recording applications, the head 106 may include a mirror and an objective lens for focusing laser light on to an adjacent disk surface.

The storage device 100 may further include a printed circuit board ("PCB") (not shown). The PCB may include, inter alia, a storage device controller for controlling read and write operations and a servo control system for generating servo control signals to position the actuator arms 130 relative to the media 104.

Figure 2:
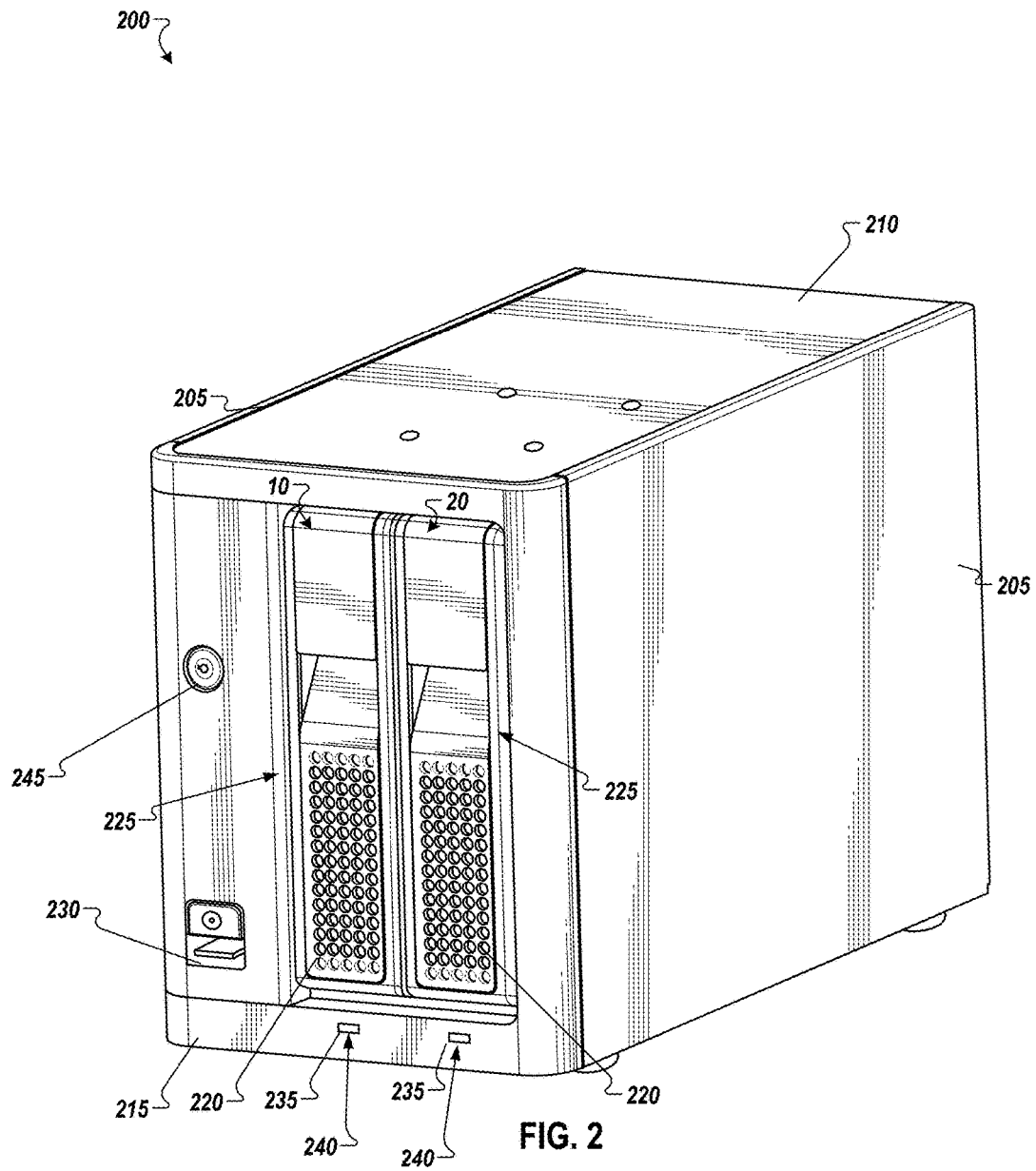
FIG. 2 is a perspective view of a drive enclosure according to an example embodiment of the present application.

FIG. 2 is a perspective view of a drive enclosure 200 according to an example embodiment of the present application. As illustrated, the drive enclosure 200 includes side panels 205, a top panel 210 and a front panel 215, collectively form a drive chassis, which defines one or more drive bays 10, 20 configured to receive a storage drive within the enclosure 200. In some embodiments, the front panel 215 includes one or more drive retaining members 220 sealing one or more drive insertion openings 225 formed through the front panel 215. In this embodiment, a pair of drive retaining members 220 is illustrated, but embodiments are not limited to this configuration and more or less drive retaining members 220 may be provided. As discussed below, each drive retaining members 220 may be formed as a door or a linear member hingedly attached to an internal structure within the drive enclosure 220 and configured to selectively seal the end of a drive bay 10, 20.

In some embodiments, the front panel 215 may also include a communication port 230, such as a USB port or any other communication port that may be apparent to a person of ordinary skill in the art. The front panel 215 may also include one or more light openings or windows 240, each configured to receive an end of a light pipe 235 inserted into the front panel 215. As discussed below, the light pipe 235 may be used to indicate status information, such as power status, connection status or any other status information that may be apparent to a person of ordinary skill in the art. For example, the light pipe 235 may convey status information through transmitting colored and/or flashing light from an indicator provided within the drive enclosure 200.

The drive enclosure 200 may also include a user interface device 245, such as a button, switch, touch screen, or any other user interface device that may be apparent to a person of ordinary skill in the art to allow a user to interact with one or more storage drives stored within the drive enclosure 200. In FIG. 2, the user interface device 245 is illustrated on the front panel 215, but is not limited to this configuration and may be placed anywhere on the drive enclosure 200 that may be apparent to a person of ordinary skill in the art.

Figure 3:
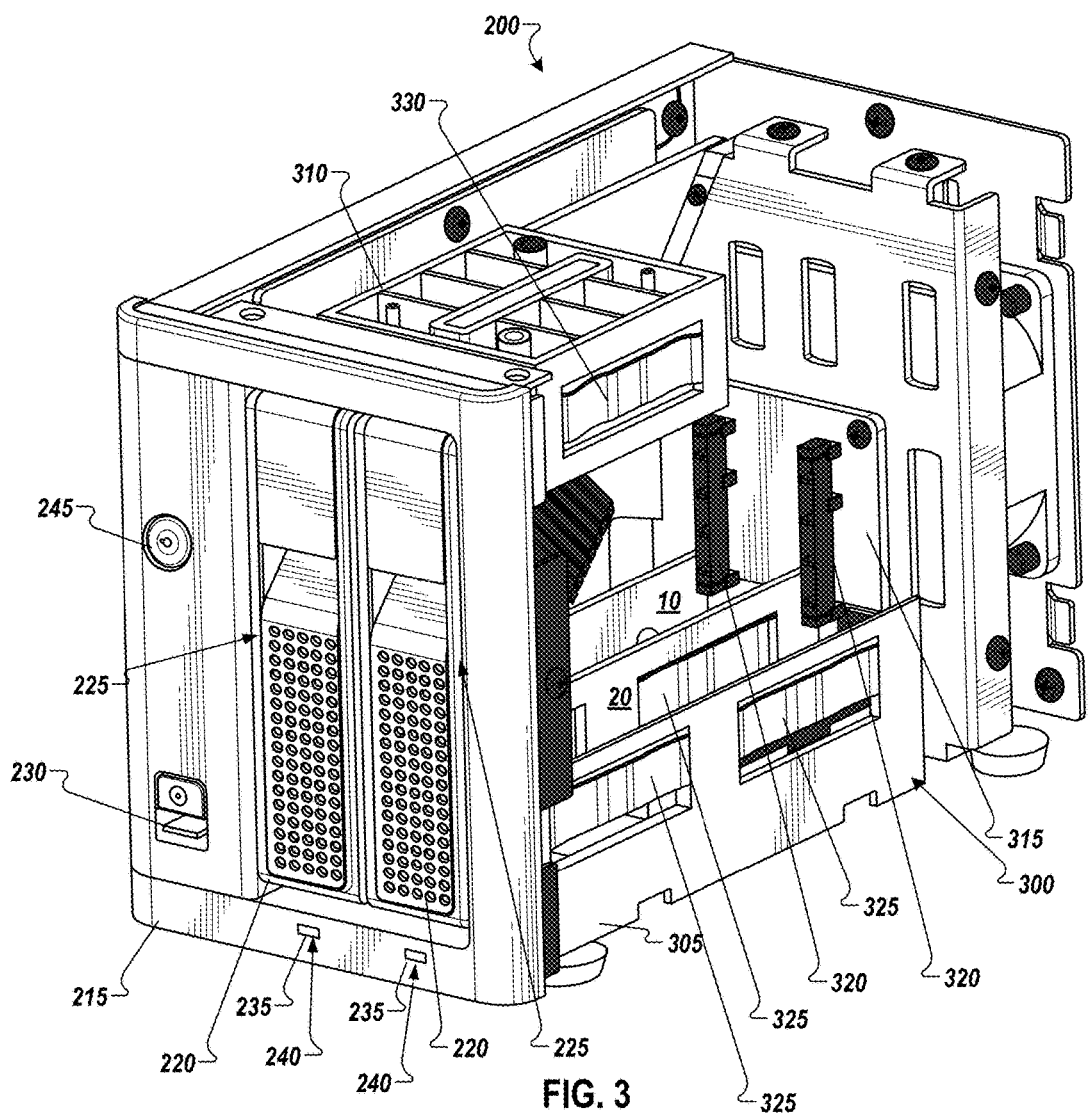
FIG. 3 is a perspective view of the drive enclosure of FIG. 2 with the top panel and one of the side panels removed.

FIG. 3 is a perspective view of the drive enclosure 200 of FIG. 2 with the top panel 210 and one of the side panels 205 removed. With the top panel 210 and the side panel 205 removed, the one or more drive bays 10, 20 within the enclosure 200 is shown. In the one or more drive bays 10, 20 of the enclosure 200, an ejection mechanism assembly 300 including a lower guide member 305 is provided. An upper guide member 310 and backplane 315 are also provided in the one or more drive bays 10, 20 of the enclosure. The backplane 315 includes one or more connectors 320 configured to connect with an installed drive 400 shown in FIG. 4. The connectors 320 may provide power to an installed drive 400 and may also provide signal exchange with the installed drive 400.

The lower guide member 305 and the upper guide member 310 together may define a drive insertion path to allow an installed drive 400 to be inserted into the one or more drive bays 10, 20 within the enclosure 200 through the drive insertion opening 225 when the drive retaining members 220 are opened. FIG. 3 illustrates both a lower guide member 305 and the upper guide member 310, but in some embodiments only a lower guide member 305 may be provided.

In some embodiments, the lower guide member 305 (illustrated in FIG. 3) may include one or more biasing members 325 configured to provide an orthogonal biasing force to align an installed drive 400 to be aligned with the connector 320 provided on the backplane 315. The biasing member 325 may be formed as a cantilever spring member or any other type of biasing member that may apply an orthogonal force to help align an installed drive 400 during installation.

Further, in some embodiments, the upper guide member 310 may also include one or more biasing members 330 (illustrated in FIG. 4) configured to provide an orthogonal biasing force to align an installed drive 400 to be aligned with the connector 320 provided on the backplane 315. The biasing member 330 may be formed as a cantilever spring member or any other type of biasing member that may apply an orthogonal force to help align an installed drive 400 during installation. FIG. 3 illustrates biasing members 325, 330 being provided on both the lower guide member 305 and the upper guide member 310, but in some embodiments biasing members 325, 330 may only be provided on lower guide member 305 only, or on the upper guide member 310 only, or no biasing members may be provided.

FIG. 4 is a perspective view of the drive enclosure 200 of FIG. 2 with the top panel 210, side panels 205, and front panel 215 removed and with a storage drive 400 installed. When one or more storage drives 400 are installed in the drive enclosure 200, the combination of the storage drive 400, the drive enclosure 200, and the associated electronics therein may be considered a server device. With the panels removed, some aspects of the lower guide member 305 and upper guide member 310 can be more clearly illustrated. As illustrated in FIG. 4, the lower guide member 305 includes a floor 335 and a plurality of side walls 340. In FIG. 4, two side walls 340 are illustrated, and a third side wall 340 is obscured by the storage drive 400 installed in the drive enclosure 200 (shown in FIGS. 5A-6B discussed below). The floor 335 and the side walls 340 may define a lower drive insertion path. For example, a storage drive 400 may be installed in the drive enclosure 200 by being inserted between two side walls 340 of the lower guide member 305, and the storage drive 400 may rest on the floor 335.

Further, the biasing members 325 may be provided on one of the side walls 340 and may be configured to bias the storage drive 400 toward another side wall 340 to allow the drive to be aligned with the connector 320 of the back plane. In some implementations, the storage drive 400 may include its own connector (not shown) configured to engage and connect to the connector 320. The type of connector is not particularly limited and may be any connector that can be used to provide power and/or signal exchange to a storage drive 400 that may be apparent to a person of ordinary skill in the art.

As illustrated in FIG. 4, the upper guide member 310 includes a ceiling 345 and a plurality of upper side walls 350. In FIG. 4, two upper side walls 350 are illustrated, and a third upper side wall is obscured by the storage drive 400 installed in the drive enclosure 200. The ceiling 345 and the upper side walls 350 may define an upper drive insertion path. For example, a storage drive 400 may be installed in the drive enclosure 200 by being inserted between two upper side walls 350 of the upper guide member 310.

Further, more biasing members 330 may be provided on one of the upper side walls 350 and may be configured to bias the storage drive 400 toward another upper side wall 350 to allow the drive to be aligned with the connector 320 of the back plane. Again, FIG. 4 illustrates biasing members 325, 330 being provided on both the lower guide member 305 and the upper guide member 310, but in some embodiments biasing members 325, 330 may only be provided on lower guide member 305 only, or on the upper guide member 310 only, or no biasing members may be provided.

Figure 5A:
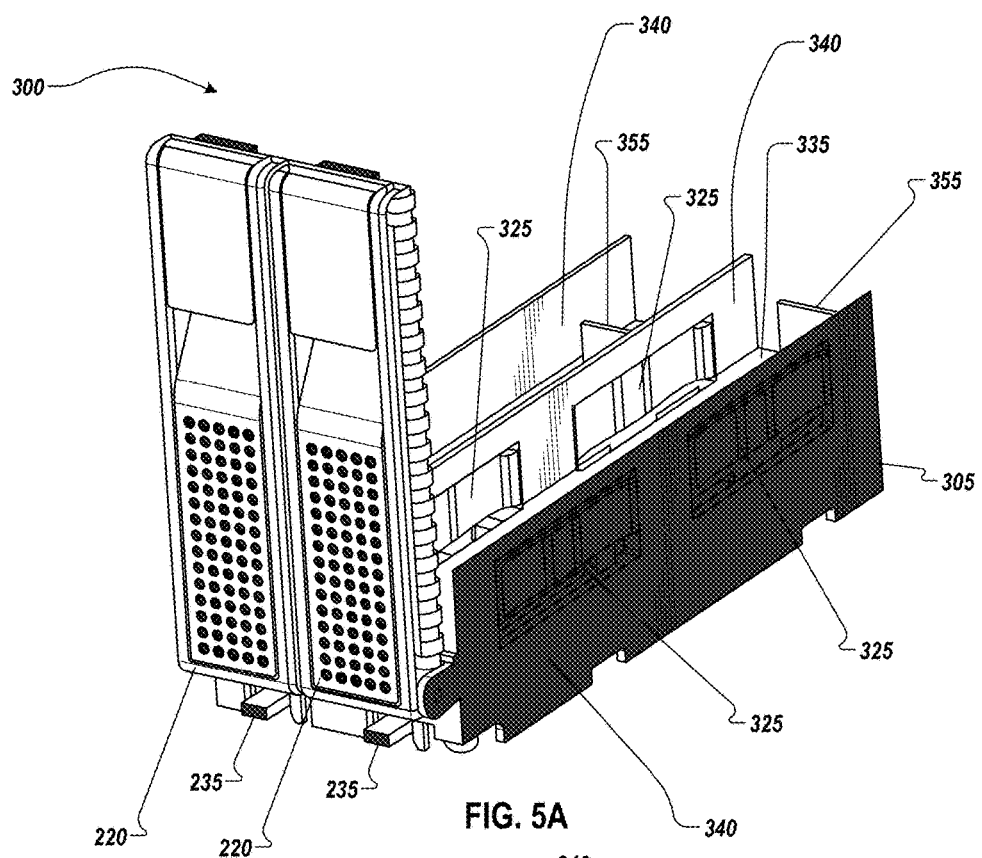
FIGS. 5A and 5B are perspective views of the ejection mechanism assembly of FIG. 4 with the drive retaining member in various positions.
Figure 5B:
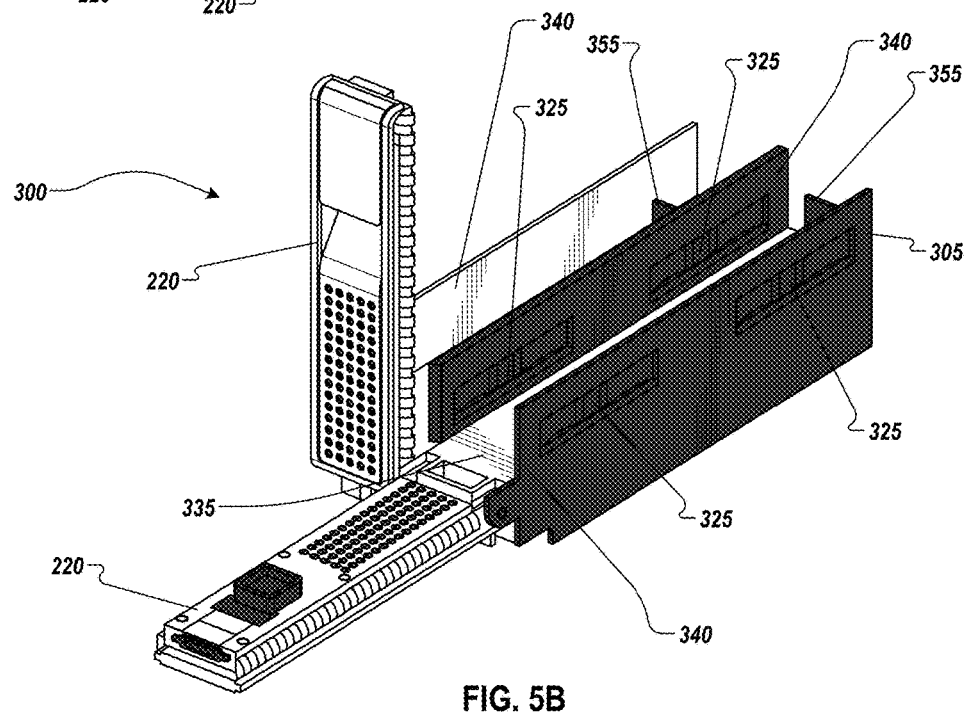

FIGS. 5A and 5B are perspective views of the ejection mechanism assembly 300 of FIG. 4 with the drive retaining members 220 in various positions. FIG. 5A illustrates the drive retaining members 220 in a raised position. FIG. 5B illustrates one of the drive retaining members 220 in a lowered positioned. As illustrated the drive retaining members 220 are hingedly attached to the lower guide member 305. The drive retaining members 220 may be moveable between a raised position (FIG. 5A) and a lowered position (FIG. 5B). In the raised position (FIG. 5A), the retaining members 220 extend orthogonal to the floor 335 of the lower guide member 305. In this position, the retaining members 220 prevent removal of a storage drive installed in the ejection mechanism assembly 300.

In the lowered position (FIG. 5B), the retaining members 220 extend substantially parallel to the floor 335 of the lower guide member 305. In this position, the retaining members 220 allow removal of a storage drive installed in the ejection mechanism. In some embodiments, an ejection member 355 may apply a biasing force to the storage drive to assist in removal of the storage drive as discussed in greater detail below.

Figure 6A:
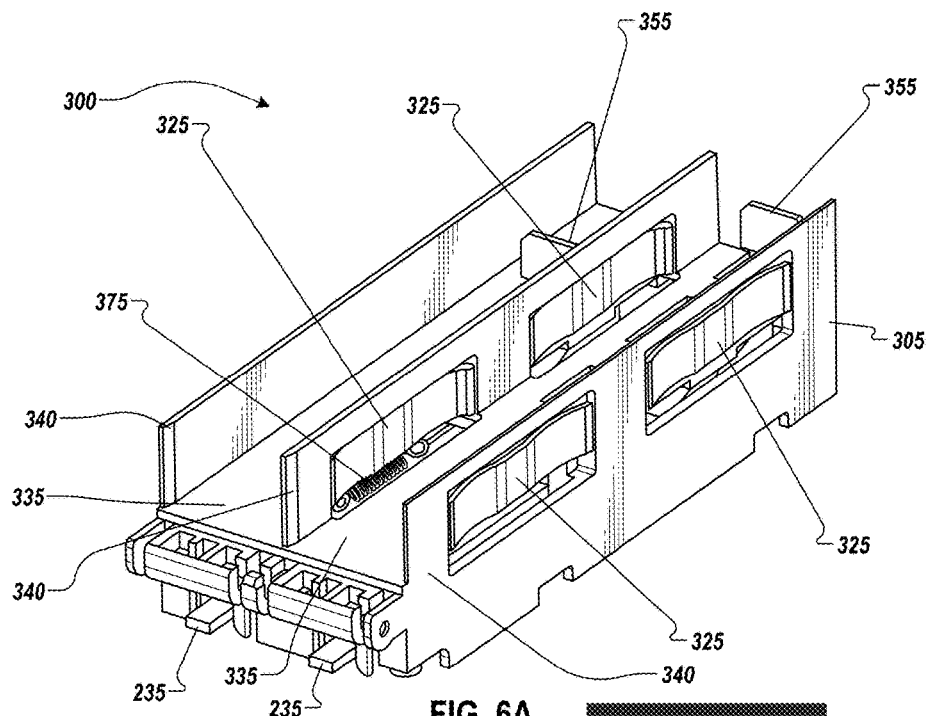
FIGS. 6A and 6B are front and back perspective views of the lower guide member of the ejection mechanism assembly of FIG. 4.
Figure 6B:
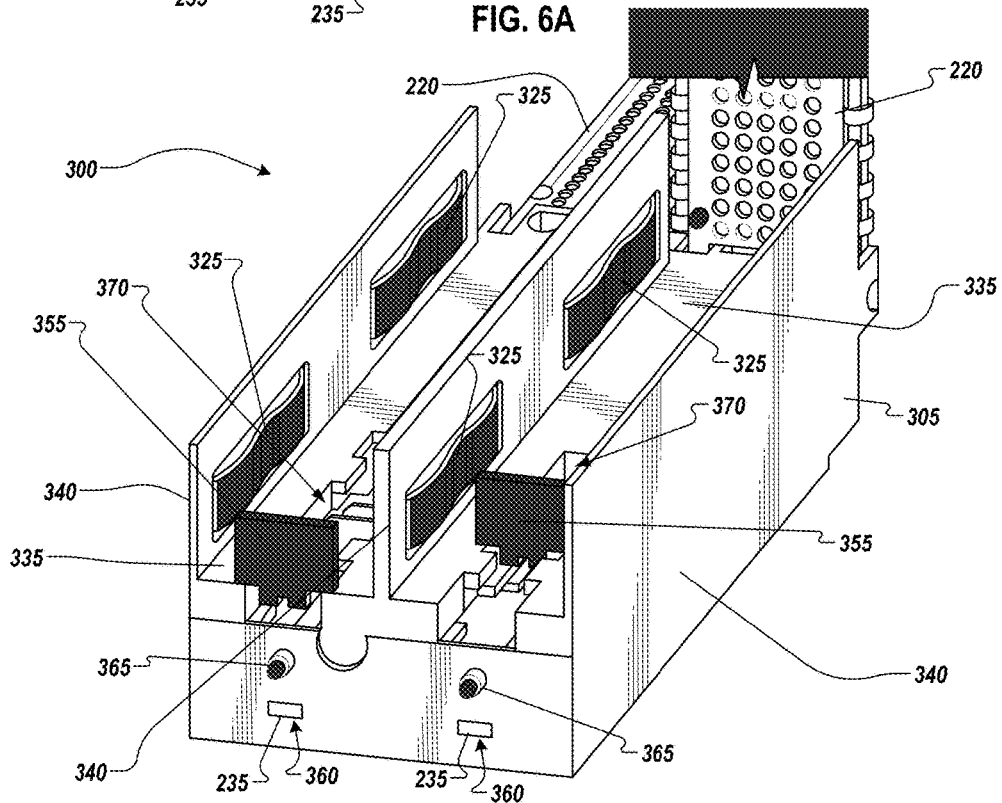

FIGS. 6A and 6B are front and back perspective views of the lower guide member 305 of the ejection mechanism assembly 300 of FIG. 4. FIG. 6A illustrates a front perspective view of the lower guide member 305 with the retaining members 220 removed. FIG. 6B illustrates a back perspective view of the lower guide member 305.

As illustrated, the floor 335 of the lower guide member 305 includes a groove (or opening) 370 that the ejection member 355 is inserted. Within this groove 370, the ejection member 355 is movable toward and away from the retaining members 220. Further, a biasing member 375 connected to an underside of the ejection member 355 may bias the ejection member 355 toward the retaining members 220. As may be understood by a person of ordinary skill in the art, when a storage drive 400 (illustrated in FIG. 4) is inserted in to the lower guide member 305, the storage drive 400 would push the ejection member 355 toward the rear of the lower guide member increasing tension in the biasing member 375. As the tension in the biasing member 375 increases, the biasing member 375 may provide an increased biasing force such that when the retaining members 220 are in the lowered position illustrated in FIG. 5B, the ejection member 355 pushes the storage drive toward the retaining member 220 allowing storage drive 400 to be disengaged from the connector 320 (illustrated in FIGS. 3 and 4) and removed from the enclosure 200. The biasing member 375 is illustrated as a coiled spring, but is not limited to this configuration and may have any other configuration that may be apparent to a person of ordinary skill in the art.

FIG. 6B, which illustrates the rear perspective of the lower guide member 305 also illustrates that one or more backplane registration members 365 to facilitate alignment with the backplane 315 illustrated in FIGS. 3 and 4 above. In some embodiments, the backplane registration member 365 may be formed as a protrusion configured to engage a corresponding indentation or opening in the backplane 315 to ensure proper alignment between the lower guide member 305 and the backplane 315. The backplane registration member 365 is not limited to this configuration and may have any other configuration that may be apparent to a person of ordinary skill in the art.

FIG. 6B also illustrates one or more light pipe access windows 360 formed in the back side of the lower guide member 305. As illustrated, an end of the light pipe 235 may be inserted through these light pipe access windows 360 to allow light to enter the light pipe 235 as discussed in greater detail below with respect to FIG. 7.

FIG. 7 illustrates a bottom perspective view of the lower guide member 305 of FIGS. 6A and 6B with the light pipe 235 installed. As illustrated, the light pipe 235 extends from the light pipe access window 360 provided at the backside of lower guide member 305 to the front side of the lower guide member 305. At the front side of the lower guide member 305 a light pipe supporting structure 380 may be provided. As illustrated, the light pipe supporting structure 380 may be a pair of retaining tabs configured to grip the light pipe 235. The portion of FIG. 7 labeled as XI is enlarged and the light pipe supporting structure 380 is shown in greater detail in FIG. 11 discussed below. Embodiments of the light pipe supporting structure 380 are not limited to this configuration and may have other configurations that may be apparent to a person of ordinary skill in the art.

As illustrated in FIG. 7, the biasing members 375, which are attached to the ejection member 355 in the groove 370, are located between the light pipe 235 and the floor 335 of the lower guide member 305. The operation of the biasing members 375 are discussed in greater detail below with respect to FIG. 8.

Figure 8:
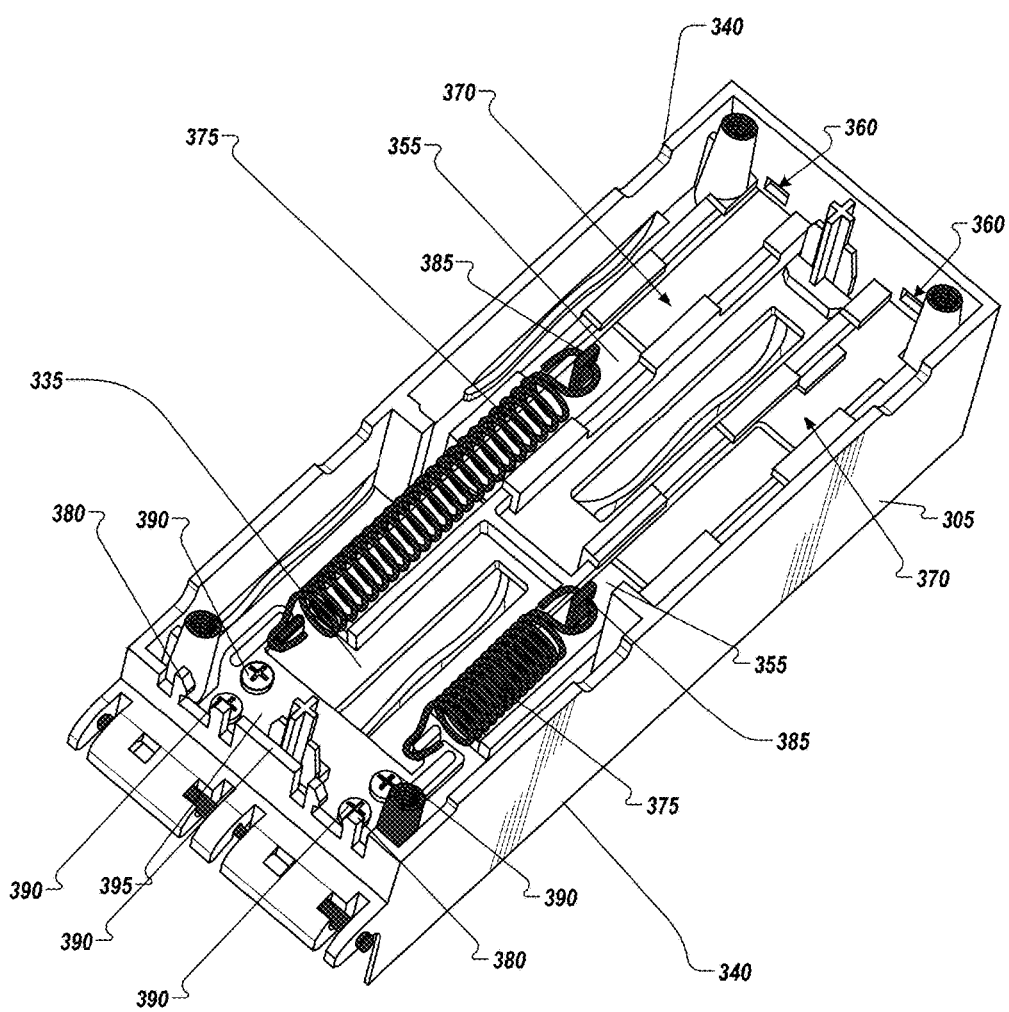
FIG. 8 illustrates the bottom perspective view of the lower guide member of FIGS. 6A and 6B with the light pipe 235 removed.

FIG. 8 illustrates the bottom perspective view of the lower guide member 305 of FIGS. 6A and 6B with the light pipes 235 removed. With the light pipes 235 removed, the underside of the floor 335 of the lower guide member 305 can be more easily visualized. As illustrated, the biasing member 375 may be connected at one end to a tab 385 formed on the underside of the ejection member 355. The tab 385 is inserted through the groove 370 formed through the floor 335 of the lower guide member 305. The other end of the biasing member 375 may be connected to a retainer plate 395 mounted to the floor 335 of the lower guide member 305 by one or more fasteners 390. Example embodiments of the present application are not limited to this configuration and may have other configurations that may be apparent to a person of ordinary skill in the art.

Figure 9:
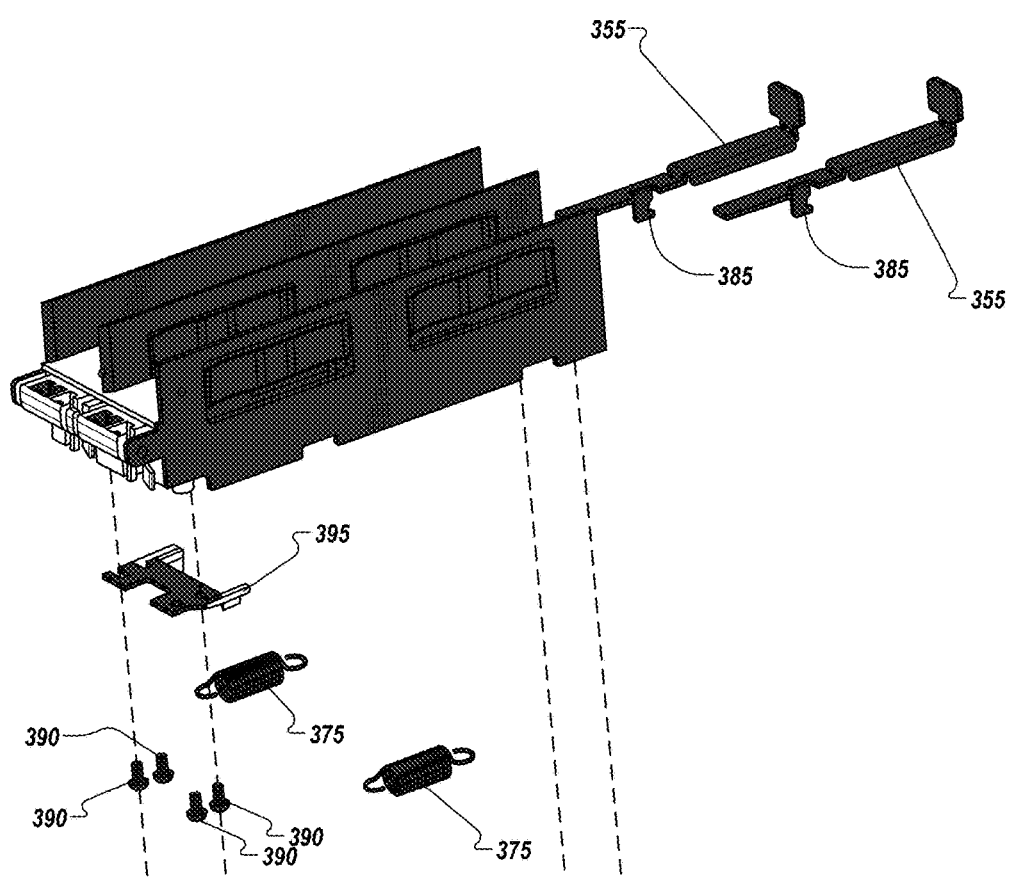
FIG. 9 is an exploded perspective view of the lower guide member of FIGS. 6A and 6B.

FIG. 9 is an exploded perspective view of the lower guide member of FIGS. 6A and 6B. As discussed above, the biasing member 375 connects the tab 385 of the ejection member 355 to the retainer plate 395. The retainer plate 395 may be attached to lower guide member 305 by one or more fasteners 390. Again, as may be understood by a person of ordinary skill in the art, when a storage drive 400 (illustrated in FIG. 4) is inserted into the lower guide member 305, the storage drive 400 would push the ejection member 355 toward the rear of the lower guide member increasing tension in the biasing member 375. As the tension in the biasing member 375 increases, the biasing member 375 may provide an increased biasing force, which causes the ejection member 355 to pushes the storage drive 400 toward the retaining member 220 allowing the storage drive 400 to be removed. Example embodiments of the present application are not limited to this configuration and may have other configurations that may be apparent to a person of ordinary skill in the art.

Figure 10:
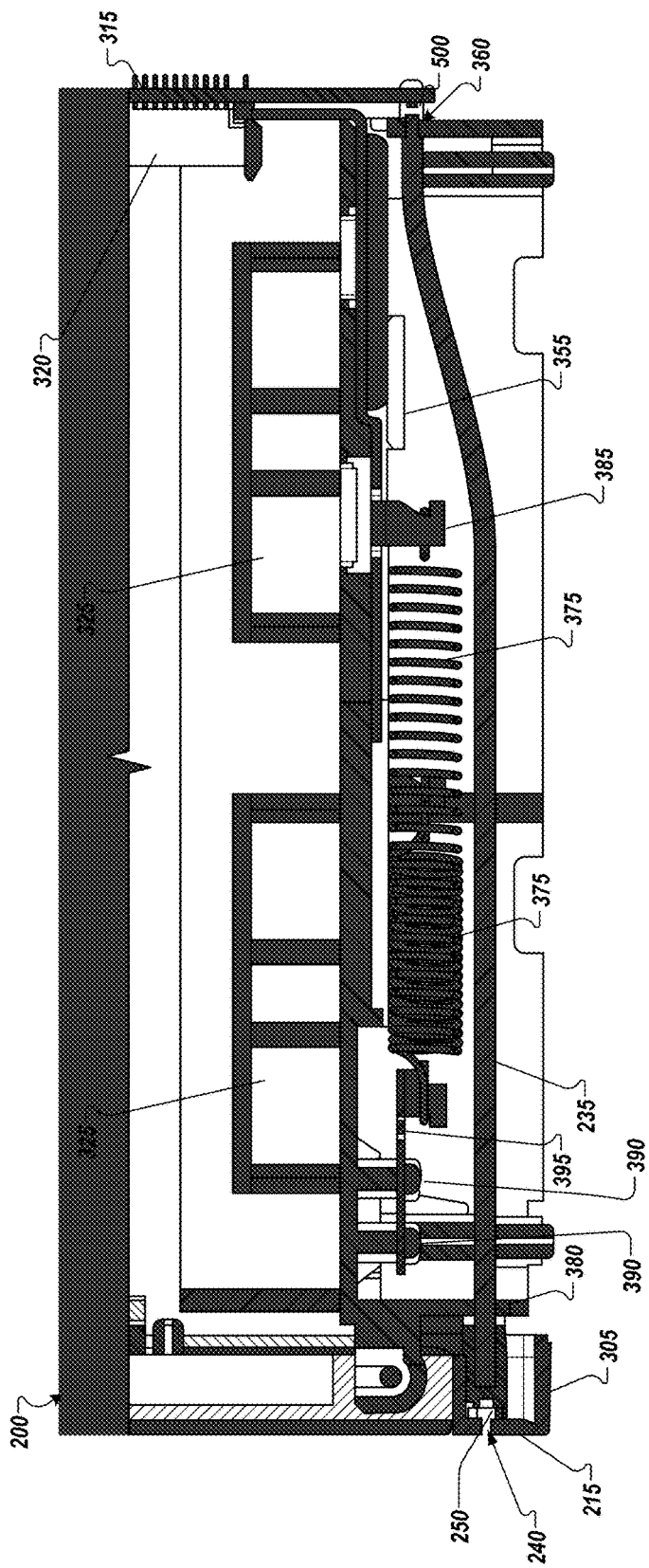
FIG. 10 is a cross-section view of the drive enclosure of FIG. 3.

FIG. 10 is a cross-section view of the drive enclosure 200 of FIG. 3. As illustrated in FIG. 10, the light pipe 235 is secured at the front end of the lower guide member 305 by the light pipe supporting structure 380 near an opening or window 240 formed in the front panel 215. In some embodiments, a lens or bezel 250 may be inserted in the opening or window 240. At the rear of the lower guide member 305, the light pipe 235 is inserted through the light pipe access window 360. Adjacent to the light pipe access window 360, a light source 500 is mounted on the backplane 315.

The light source 500 is not particularly limited and may include a small light bulb, a light emitting device, or any other light source that may be apparent to a person of ordinary skill in the art. The light source 500 may indicate status information from electronics mounted on the backplane 315. For example, the light source may indicate connection status between a storage drive (such as storage drive 400 illustrated in FIG. 4) and the connector 320.

Light emitted from the light source 500 may travel through the light pipe access window 360, travel through the light pipe 235 and be emitted out of enclosure 200 through an opening or window 240 formed through the front panel 215.

FIG. 11 is a perspective view of the light bar 235 removed from the lower guide member 305. As illustrated, the light pipe 235 may include front attachment feature 255 and a rear attachment feature 260. The front attachment feature 255 may be formed as a region of the light pipe 235 having a reduced width. Further, the rear attachment feature 260 may be formed as a region of reduced width and reduced thickness. However, example embodiments of the light pipe 235 are not limited to this configuration and may have other configurations that may be apparent to a person of ordinary skill in the art.

In some embodiments, the light pipe 235 may be formed from a transparent polymer, resin, or glass that may be apparent to a person of ordinary skill in the art. Further, the light pipe 235 may have internal reflectance such that a portion of light entering one end of the light pipe is internally reflected until exiting an opposite end of the light pipe.

FIG. 12 is an enlarged portion of FIG. 7 illustrating a portion of the lower guide member 305. As illustrated, the front attachment feature 255 of the light pipe 235 is inserted into the light pipe supporting structure 380. In the illustrated embodiment, the light pipe supporting structure 380 is formed as a pair of latching beams 380. As may be understood by a person of ordinary skill in the art, when the light pipe 235 is inserted between the latching beams 380, the latching beams 380 may bend outward initially before returning to the initial position in with the front attachment feature 255 entrapped between the pair of latching beams 380 as illustrated. However, example embodiments of the light pipe supporting structure 380 are not limited to this configuration and may have other configurations that may be apparent to a person of ordinary skill in the art.

FIG. 13 is an enlarged view of light source 500 of the backplane 315 illustrated in FIG. 10. As illustrated, the rear attachment feature 260 of the light pipe 235 is inserted into light pipe access window 360. In the illustrated embodiment, the reduced width and the reduced thickness of the rear attachment feature 260 may allow the light pipe 235 to be securely held in place by the light pipe access window 360. By securely holding the light pipe 235, the light pipe access window 360 may align the light pipe 235 with the light source 500 of the backplane 315 to allow light to be transmitted from the light source 500 into the light pipe 235. However, example embodiments of the lower guide member 305 are not limited to this configuration and may have other configurations that may be apparent to a person of ordinary skill in the art.

Figure 14:
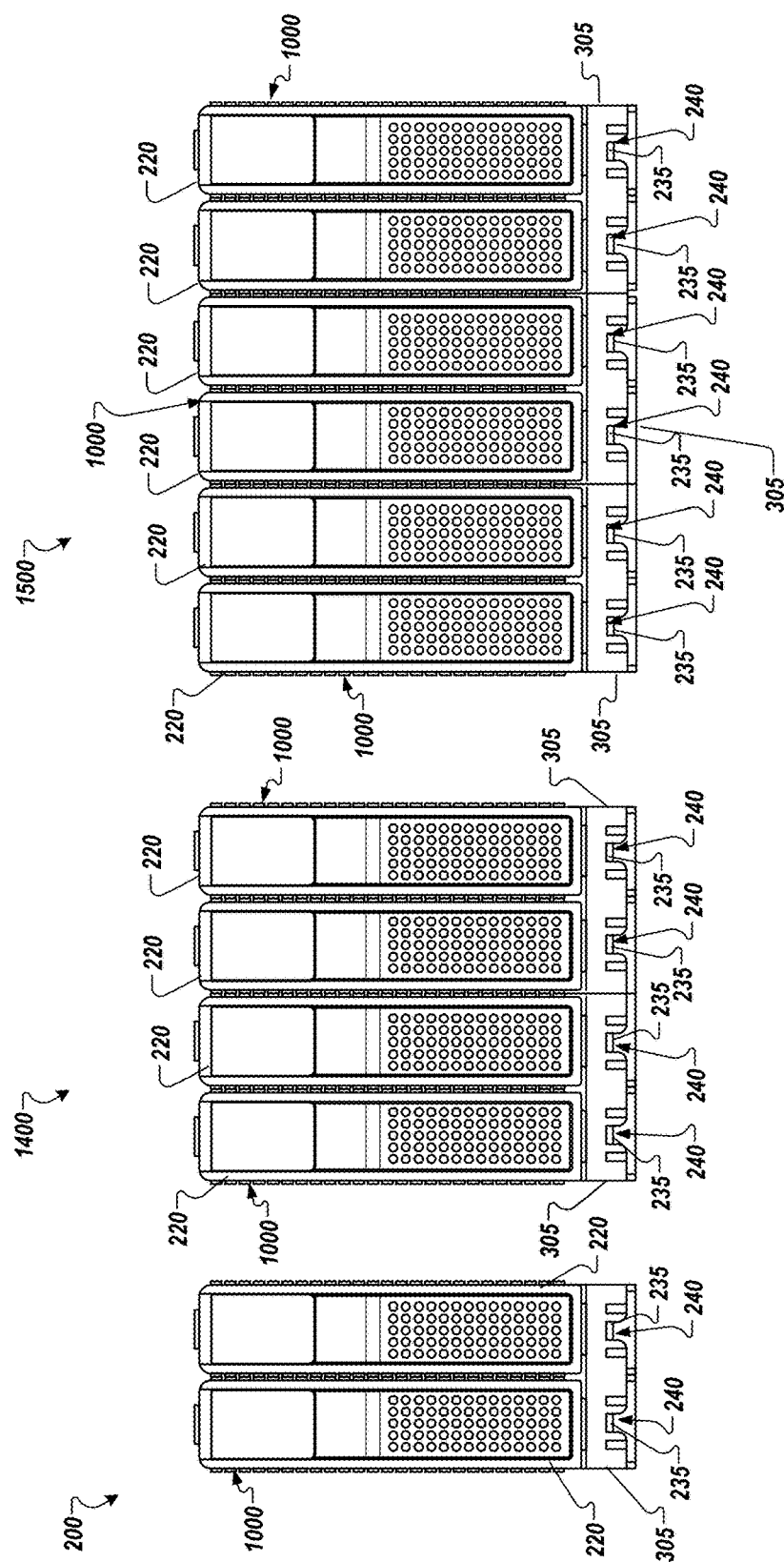
FIG. 14 illustrates several alternative embodiments of the drive enclosure.

FIG. 14 illustrates several alternative embodiments 1400, 1500 of the drive enclosure 200. In the embodiment illustrated in FIGS. 2-13, the drive enclosure 200 is illustrated with a pair of retaining members 220 attached to a single lower guide member 305 having a pair of light pipes 235 each exposed by an opening or window 240. This enclosure 200 provides a pair of drive insertion paths to receive a pair of drives. However, this embodiment may represent one modular structure 1000 that can be combined with other, similar modular structures 1000 to create enclosures having any number of drive insertion paths for receiving any number of storage drives as may be apparent to a person of ordinary skill in the art. For example, the enclosure 1400 may be formed from two of these modular structures 1000 to provide 4 drive insertion paths for receiving 4 storage drives. Further, the enclosure 1500 may be formed from three of these modular structures 1000 to provide 6 drive insertion paths for receiving 6 storage drives.

While certain embodiments have been described herein, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

We claim:

1. A drive ejection mechanism assembly for a storage drive, the drive ejection mechanism assembly comprising:
 a lower guide member having a first end and a second end, the lower guide member being configured for placement in a drive bay and comprising:
  a floor; and
  at least one side wall extending upward from the floor of the lower guide member, wherein the floor and the at least one side wall define a lower drive insertion path;
 an ejection member slidingly coupled to the lower guide member;
 a drive retaining member hingedly connected to the first end of the lower guide member; and
 a biasing member configured to bias the ejection member relative to the drive retaining member, wherein a first end of the biasing member is connected to the ejection member and a second end of the biasing member is connected to a retaining plate mounted to the floor of the lower guide member.

2. The drive ejection mechanism assembly of claim 1, wherein the at least one side wall of the lower guide member comprises:
 a first side wall; and
 a second side wall extending substantially parallel to the first side wall, the second side wall having an alignment biasing member configured to apply a biasing force in the direction of the first side wall.

3. The drive ejection mechanism assembly of claim 1, wherein the biasing member is connected to a tab extending from the ejection member through a groove formed in the floor of the lower guide member to an underside of the floor.

4. The drive ejection mechanism assembly of claim 1, wherein the lower guide member further comprises a backplane registration member configured to engage a backplane disposed within a chassis of the storage drive, the backplane registration member being disposed on the second end of the lower guide member, the second end of the lower guide member being opposite the first end of the lower guide member.

5. The drive ejection mechanism assembly of claim 1, wherein the drive retaining member comprises a linear member hingedly connected to the lower guide member and rotatable between a retaining position substantially perpendicular to the floor of the lower guide member and an open position substantially parallel to the floor of the lower guide member.

6. The drive ejection mechanism assembly of claim 1, further comprising a light pipe configured to transmit light between the first end and the second end of the lower guide member, wherein the light pipe is mounted on the lower guide member below the floor of the lower guide member.

7. The drive ejection mechanism assembly of claim 1, wherein:
tension in the biasing member increases when the storage drive is inserted in the drive bay; and
the tension in the biasing member decreases when the storage drive is removed from the drive bay.

8. The drive ejection mechanism assembly of claim 1, wherein:
the ejection member and the biasing member are not connected to the drive retaining member; and
a change in tension in the biasing member causes the storage drive to be ejected from the drive bay.

9. A storage drive enclosure for a storage drive, the storage drive enclosure comprising:
a drive chassis defining at least one storage drive bay; and
a drive ejection mechanism assembly disposed within the chassis, the drive ejection mechanism assembly comprising:
a lower guide member having a first end and a second end, the lower guide member being mounted in the drive chassis and comprising:
a floor; and
at least one side wall extending upward from the floor of the lower guide member, wherein the floor and the at least one side wall define a lower drive insertion path;
an ejection member slidingly coupled to the lower guide member;
a drive retaining member hingedly connected to the first end of the lower guide member; and
a biasing member configured to bias the ejection member relative to the drive retaining member, wherein a first end of the biasing member is connected to the ejection member and a second end of the biasing member is connected to a retaining plate mounted to the floor of the lower guide member.

10. The storage drive enclosure of claim 9, further comprising a backplane disposed within the drive chassis, the backplane being disposed adjacent to the second end of the lower guide member,
wherein the backplane comprises a connector configured to engage a corresponding connector on the storage drive inserted in the at least one storage drive bay.

11. The storage drive enclosure of claim 10, wherein the at least one side wall of the lower guide member comprises:
a first side wall; and
a second side wall extending substantially parallel to the first side wall, the second side wall having an alignment biasing member configured to apply a biasing force in the direction of the first side wall to the storage drive inserted into the at least one storage drive bay to facilitate alignment between the connector of the backplane and the corresponding connector of the storage drive.

12. The storage drive enclosure of claim 10, wherein the lower guide member further comprises a backplane registration member configured to engage the backplane and align the lower guide member with the connector of the backplane, the backplane registration member being disposed on the second end of the lower guide member, the second end of the lower guide member being opposite the first end of the lower guide member.

13. The storage drive enclosure of claim 10, further comprising a light pipe configured to transmit light between the first end and the second end of the lower guide member.

14. The storage drive enclosure of claim 13, wherein:
the backplane further comprises an indicator light source;
an end of the light pipe is disposed adjacent to the indicator light source; and
the light pipe is mounted on the lower guide member below the floor of the lower guide member between the lower guide member and the drive chassis.

15. The storage drive enclosure of claim 9, further comprising an upper guide member being mounted above the lower guide member in the chassis and aligned with the lower guide member,
wherein the upper guide member comprises:
a ceiling; and
at least one upper side wall extending downward from the ceiling of the upper guide member, wherein the ceiling and the at least one upper side wall define an upper drive insertion path.

16. The storage drive enclosure of claim 9, wherein:
the ejection member is pushed towards the second end of the lower guide member when the storage drive is inserted within the at least one storage drive bay, and
the ejection member is pushed towards the first end of the lower guide member when the storage drive is removed from the at least one storage drive bay.

17. The storage drive enclosure of claim 9, wherein the drive retaining member comprises a linear member hingedly connected to the lower guide member and rotatable between a retaining position substantially perpendicular to the floor of the lower guide member and an open position substantially parallel to the floor of the lower guide member.

18. A server device comprising:
a storage drive enclosure comprising:
a drive chassis defining at least two storage drive bays; and
a drive ejection mechanism assembly disposed within the chassis, the drive ejection mechanism assembly comprising:
a lower guide member having a first end and a second end, the lower guide member being mounted in the chassis and comprising:
a floor;
a first side wall extending upward from the floor of the lower guide member, wherein the floor and the first side wall define a lower drive insertion path for a first storage drive bay of the at least two storage drive bays; and
a second side wall extending upward from the floor of the lower guide member,. wherein the floor and the second side wall define a lower drive insertion path for a second storage drive bay of the at least two drive storage drive bays;
a first ejection member slidingly coupled to the lower guide member;

a second ejection member slidingly coupled to the lower guide member;

a first drive retaining member hingedly connected to the first end of the lower guide member;

a second drive retaining member hingedly connected to the first end of the lower guide member;

a first biasing member configured to bias the first ejection member relative to the first drive retaining member, wherein a first end of the first biasing member is connected to the first ejection member and a second end of the first biasing member is connected to a retaining plate mounted to the floor of the lower guide member; and a second biasing member configured to bias the second ejection member relative to the second drive retaining member, wherein a first end of the second biasing member is connected to the second ejection member and a second end of the second biasing member is connected to the retaining plate mounted to the floor of the lower guide member.

19. The server device of claim 18, further comprising a backplane disposed within the drive chassis, the backplane being disposed adjacent to the second end of the guide member, wherein the backplane comprises:

a first connector configured to engage a corresponding connector on a first storage drive inserted in the first storage drive bay; and a second connector configured to engage a corresponding connector on a second storage drive inserted in the second storage drive bay.

20. The server device of claim 19, wherein the lower guide member further comprises:

a third side wall extending substantially parallel to the first side wall, the third side wall comprising a first alignment biasing member configured to apply a biasing force toward the first side wall, the biasing force being applied to the first storage drive inserted into the first storage drive bay to facilitate alignment between the first connector of the backplane and the corresponding connector of the first storage drive; and a fourth side wall extending substantially parallel to the second side wall, the fourth side wall comprising a second alignment biasing member configured to apply a biasing force toward the second side wall, the biasing force being applied to the second storage drive inserted into the second storage drive bay to facilitate alignment between the second connector of the backplane and the corresponding connector of the second storage drive.

* * * * *